United States Patent
Zhong et al.

(10) Patent No.: US 7,652,814 B2
(45) Date of Patent: Jan. 26, 2010

(54) MEMS DEVICE WITH INTEGRATED OPTICAL ELEMENT

(75) Inventors: Fan Zhong, Fremont, CA (US); Chun-Ming Wang, Fremont, CA (US); Stephen Zee, San Jose, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 109 days.

(21) Appl. No.: 11/656,681

(22) Filed: Jan. 23, 2007

(65) Prior Publication Data

US 2007/0285761 A1    Dec. 13, 2007

Related U.S. Application Data

(60) Provisional application No. 60/762,723, filed on Jan. 27, 2006.

(51) Int. Cl.
G02B 26/00 (2006.01)
(52) U.S. Cl. ........................ 359/291; 359/290
(58) Field of Classification Search ............... 359/291
See application file for complete search history.

(56) References Cited

U.S. PATENT DOCUMENTS

| | | |
|---|---|---|
| 3,656,836 A | 4/1972 | de Cremoux et al. |
| 4,377,324 A | 3/1983 | Durand et al. |
| 4,403,248 A | 9/1983 | te Velde |
| 4,459,182 A | 7/1984 | te Velde |
| 4,482,213 A | 11/1984 | Piliavin et al. |
| 4,663,181 A | 5/1987 | Murali |
| 4,859,060 A | 8/1989 | Katagiri et al. |
| 4,863,245 A | 9/1989 | Roxlo |
| 4,965,562 A | 10/1990 | Verhulst |
| 5,037,173 A | 8/1991 | Sampsell et al. |
| 5,061,049 A | 10/1991 | Hornbeck |
| 5,078,479 A | 1/1992 | Vuilleumier |
| 5,079,544 A | 1/1992 | DeMond et al. |
| 5,099,353 A | 3/1992 | Hornbeck |

(Continued)

FOREIGN PATENT DOCUMENTS

CH      680534      9/1992

(Continued)

OTHER PUBLICATIONS

Aratani et al., "Process and Design Considerations for Surface Micromachined Beams for a Tuneable Interferometer Array in Silicon," Proc. IEEE Microelectromechanical Workshop, Fort Lauderdale, FL, pp. 230-235 (Feb. 1993).

(Continued)

*Primary Examiner*—Jordan M. Schwartz
*Assistant Examiner*—James C Jones
(74) *Attorney, Agent, or Firm*—Knobbe Martens Olson & Bear LLP

(57) ABSTRACT

MEMS devices are fabricated by a method that involves forming an optical element (e.g., etalon) over a substrate and then forming a light modulating element (e.g., interferometric modulator) over the optical element. In an embodiment, a support structure for the light modulating element is aligned with the underlying optical element to thereby alter the appearance of the support structure to a viewer. Such an optical element is separated from the support structure by one or more buffer layers.

31 Claims, 14 Drawing Sheets

U.S. PATENT DOCUMENTS

| | | |
|---|---|---|
| 5,142,405 A | 8/1992 | Hornbeck |
| 5,214,419 A | 5/1993 | DeMond et al. |
| 5,214,420 A | 5/1993 | Thompson et al. |
| 5,218,472 A | 6/1993 | Jozefowicz et al. |
| 5,226,099 A | 7/1993 | Mignardi et al. |
| 5,272,473 A | 12/1993 | Thompson et al. |
| 5,293,272 A | 3/1994 | Jannson et al. |
| 5,312,512 A | 5/1994 | Allman et al. |
| 5,312,513 A | 5/1994 | Florence et al. |
| 5,315,370 A | 5/1994 | Bulow |
| 5,327,286 A | 7/1994 | Sampsell et al. |
| 5,381,232 A | 1/1995 | van Wijk |
| 5,474,865 A | 12/1995 | Vasudev |
| 5,488,505 A | 1/1996 | Engle |
| 5,506,597 A | 4/1996 | Thompson et al. |
| 5,515,076 A | 5/1996 | Thompson et al. |
| 5,523,803 A | 6/1996 | Urbanus et al. |
| 5,526,688 A | 6/1996 | Boysel et al. |
| 5,563,398 A | 10/1996 | Sampsell |
| 5,578,976 A | 11/1996 | Yao |
| 5,597,736 A | 1/1997 | Sampsell |
| 5,602,671 A | 2/1997 | Hornbeck |
| 5,629,790 A | 5/1997 | Neukermans et al. |
| 5,638,946 A | 6/1997 | Zavracky |
| 5,665,997 A | 9/1997 | Weaver et al. |
| 5,674,757 A | 10/1997 | Kim |
| 5,706,022 A | 1/1998 | Hato |
| 5,737,050 A | 4/1998 | Takahara et al. |
| 5,771,321 A | 6/1998 | Stern |
| 5,784,189 A | 7/1998 | Bozler et al. |
| 5,818,095 A | 10/1998 | Sampsell |
| 5,822,170 A | 10/1998 | Cabuz et al. |
| 5,824,608 A | 10/1998 | Gotoh et al. |
| 5,835,256 A | 11/1998 | Huibers |
| 5,943,155 A | 8/1999 | Goossen |
| 5,945,980 A | 8/1999 | Moissey et al. |
| 5,959,763 A | 9/1999 | Bozler et al. |
| 5,967,163 A | 10/1999 | Pan et al. |
| 5,976,902 A | 11/1999 | Shih |
| 5,994,174 A | 11/1999 | Carey et al. |
| 6,031,653 A | 2/2000 | Wang |
| 6,040,937 A | 3/2000 | Miles |
| 6,088,162 A | 7/2000 | Someno |
| 6,097,145 A | 8/2000 | Kastalsky et al. |
| 6,099,132 A | 8/2000 | Kaeriyama |
| 6,137,150 A | 10/2000 | Takeuchi et al. |
| 6,158,156 A | 12/2000 | Patrick |
| 6,160,833 A | 12/2000 | Floyd et al. |
| 6,171,945 B1 | 1/2001 | Mandal et al. |
| 6,194,323 B1 | 2/2001 | Downey et al. |
| 6,201,633 B1 | 3/2001 | Peeters et al. |
| 6,219,015 B1 | 4/2001 | Bloom et al. |
| 6,243,149 B1 | 6/2001 | Swanson et al. |
| 6,249,039 B1 | 6/2001 | Harvey et al. |
| 6,275,220 B1 | 8/2001 | Nitta |
| 6,282,010 B1 | 8/2001 | Sulzbach et al. |
| 6,288,824 B1 | 9/2001 | Kastalsky et al. |
| 6,323,982 B1 | 11/2001 | Hornbeck |
| 6,327,071 B1 | 12/2001 | Kimura et al. |
| 6,333,556 B1 | 12/2001 | Juengling et al. |
| 6,335,224 B1 | 1/2002 | Peterson |
| 6,340,435 B1 | 1/2002 | Bjorkman et al. |
| 6,376,787 B1 | 4/2002 | Martin et al. |
| 6,391,675 B1 | 5/2002 | Ehmke et al. |
| 6,392,781 B1 | 5/2002 | Kim et al. |
| 6,399,257 B1 | 6/2002 | Shirota et al. |
| 6,424,094 B1 | 7/2002 | Feldman |
| 6,438,282 B1 | 8/2002 | Takeda et al. |
| 6,449,084 B1 | 9/2002 | Guo |
| 6,452,124 B1 | 9/2002 | York et al. |
| 6,452,465 B1 | 9/2002 | Brown et al. |
| 6,466,354 B1 | 10/2002 | Gudeman |
| 6,466,358 B2 | 10/2002 | Tew |
| 6,513,911 B1 | 2/2003 | Ozaki et al. |
| 6,549,195 B2 | 4/2003 | Hikida et al. |
| 6,549,338 B1 | 4/2003 | Wolverton et al. |
| 6,552,840 B2 | 4/2003 | Knipe |
| 6,574,033 B1 | 6/2003 | Chui et al. |
| 6,589,625 B1 | 7/2003 | Kothari et al. |
| 6,600,201 B2 | 7/2003 | Hartwell et al. |
| 6,608,268 B1 | 8/2003 | Goldsmith |
| 6,624,944 B1 | 9/2003 | Wallace et al. |
| 6,639,724 B2 | 10/2003 | Bower et al. |
| 6,643,069 B2 | 11/2003 | Dewald |
| 6,650,455 B2 | 11/2003 | Miles |
| 6,653,997 B2 | 11/2003 | Van Gorkom et al. |
| 6,660,656 B2 | 12/2003 | Cheung et al. |
| 6,671,149 B1 | 12/2003 | Chea et al. |
| 6,674,562 B1 | 1/2004 | Miles |
| 6,720,267 B1 | 4/2004 | Chen et al. |
| 6,741,377 B2 | 5/2004 | Miles |
| 6,743,570 B2 | 6/2004 | Harnett et al. |
| 6,747,785 B2 | 6/2004 | Chen et al. |
| 6,747,800 B1 | 6/2004 | Lin |
| 6,791,441 B2 | 9/2004 | Pillans et al. |
| 6,794,119 B2 | 9/2004 | Miles |
| 6,803,534 B1 | 10/2004 | Chen et al. |
| 6,806,557 B2 | 10/2004 | Ding |
| 6,809,788 B2 | 10/2004 | Yamada et al. |
| 6,811,267 B1 | 11/2004 | Allen et al. |
| 6,819,469 B1 | 11/2004 | Koba |
| 6,844,959 B2 | 1/2005 | Huibers et al. |
| 6,855,610 B2 | 2/2005 | Tung et al. |
| 6,858,080 B2 | 2/2005 | Linares et al. |
| 6,859,301 B1 | 2/2005 | Islam et al. |
| 6,870,581 B2 | 3/2005 | Li et al. |
| 6,906,847 B2 | 6/2005 | Huibers et al. |
| 6,912,022 B2 | 6/2005 | Lin et al. |
| 6,912,082 B1 | 6/2005 | Lu et al. |
| 6,940,631 B2 | 9/2005 | Ishikawa |
| 6,947,200 B2 | 9/2005 | Huibers |
| 6,952,303 B2 | 10/2005 | Lin et al. |
| 6,958,847 B2 | 10/2005 | Lin |
| 6,959,990 B2 | 11/2005 | Penn |
| 6,980,350 B2 | 12/2005 | Hung et al. |
| 6,995,890 B2 | 2/2006 | Lin |
| 6,999,225 B2 | 2/2006 | Lin |
| 6,999,236 B2 | 2/2006 | Lin |
| 7,016,099 B2 | 3/2006 | Ikeda et al. |
| 7,049,164 B2 | 5/2006 | Bruner |
| 7,064,880 B2 | 6/2006 | Mushika |
| 7,078,293 B2 | 7/2006 | Lin et al. |
| 7,110,158 B2 | 9/2006 | Miles |
| 7,123,216 B1 | 10/2006 | Miles |
| 7,126,741 B2 | 10/2006 | Wagner et al. |
| 7,142,346 B2 | 11/2006 | Chui et al. |
| 7,145,213 B1 | 12/2006 | Ebel |
| 7,161,730 B2 | 1/2007 | Floyd |
| 7,172,915 B2 | 2/2007 | Lin et al. |
| 7,184,202 B2 | 2/2007 | Miles et al. |
| 7,250,315 B2 | 7/2007 | Miles |
| 7,256,922 B2 | 8/2007 | Chui et al. |
| 7,259,865 B2 | 8/2007 | Cummings et al. |
| 7,297,471 B1 | 11/2007 | Miles |
| 7,323,217 B2 | 1/2008 | Lin et al. |
| 7,327,510 B2 | 2/2008 | Cummings et al. |
| 7,349,136 B2 | 3/2008 | Chui |
| 7,369,296 B2 | 5/2008 | Floyd |
| 7,373,026 B2 | 5/2008 | Chui |
| 2001/0010953 A1 | 8/2001 | Kang et al. |
| 2001/0026951 A1 | 10/2001 | Vergani et al. |
| 2001/0040649 A1 | 11/2001 | Ozaki |
| 2001/0055208 A1 | 12/2001 | Kimura |
| 2002/0014579 A1 | 2/2002 | Dunfield |

| | | |
|---|---|---|
| 2002/0036304 A1 | 3/2002 | Ehmke et al. |
| 2002/0058422 A1 | 5/2002 | Jang et al. |
| 2002/0070931 A1 | 6/2002 | Ishikawa |
| 2002/0109899 A1 | 8/2002 | Ohtaka et al. |
| 2002/0114558 A1 | 8/2002 | Nemirovsky |
| 2002/0145185 A1 | 10/2002 | Shrauger |
| 2002/0149850 A1 | 10/2002 | Heffner et al. |
| 2002/0167072 A1 | 11/2002 | Andosca |
| 2002/0167730 A1 | 11/2002 | Needham et al. |
| 2002/0171610 A1 | 11/2002 | Siwinski et al. |
| 2002/0186209 A1 | 12/2002 | Cok |
| 2002/0195681 A1 | 12/2002 | Melendez et al. |
| 2003/0007107 A1 | 1/2003 | Chae |
| 2003/0015936 A1 | 1/2003 | Yoon et al. |
| 2003/0021004 A1 | 1/2003 | Cunningham et al. |
| 2003/0053078 A1 | 3/2003 | Missey et al. |
| 2003/0077843 A1 | 4/2003 | Yamauchi et al. |
| 2003/0102771 A1 | 6/2003 | Akiba et al. |
| 2003/0118920 A1 | 6/2003 | Johnstone et al. |
| 2003/0123123 A1 | 7/2003 | Huffman |
| 2003/0123125 A1 | 7/2003 | Little |
| 2003/0132822 A1 | 7/2003 | Ko et al. |
| 2003/0156315 A1 | 8/2003 | Li et al. |
| 2003/0164350 A1 | 9/2003 | Hanson et al. |
| 2003/0179527 A1 | 9/2003 | Chea |
| 2003/0210851 A1 | 11/2003 | Fu et al. |
| 2004/0058532 A1 | 3/2004 | Miles et al. |
| 2004/0061543 A1 | 4/2004 | Nam et al. |
| 2004/0080035 A1 | 4/2004 | Delapierre |
| 2004/0080807 A1 | 4/2004 | Chen et al. |
| 2004/0100594 A1 | 5/2004 | Huibers et al. |
| 2004/0100677 A1 | 5/2004 | Huibers et al. |
| 2004/0124073 A1 | 7/2004 | Pilans et al. |
| 2004/0125281 A1 | 7/2004 | Lin et al. |
| 2004/0125282 A1 | 7/2004 | Lin et al. |
| 2004/0125347 A1 | 7/2004 | Patel et al. |
| 2004/0125536 A1 | 7/2004 | Arney et al. |
| 2004/0136076 A1 | 7/2004 | Tayebati |
| 2004/0140557 A1 | 7/2004 | Sun et al. |
| 2004/0150869 A1 | 8/2004 | Kasai |
| 2004/0150936 A1 | 8/2004 | Chea |
| 2004/0150939 A1 | 8/2004 | Huff |
| 2004/0175577 A1 | 9/2004 | Lin et al. |
| 2004/0191937 A1 | 9/2004 | Patel et al. |
| 2004/0217264 A1 | 11/2004 | Wood et al. |
| 2004/0217919 A1 | 11/2004 | Pichl et al. |
| 2004/0233503 A1 | 11/2004 | Kimura |
| 2005/0012577 A1 | 1/2005 | Pillans et al. |
| 2005/0012975 A1 | 1/2005 | George et al. |
| 2005/0024557 A1 | 2/2005 | Lin |
| 2005/0030490 A1 | 2/2005 | Huibers |
| 2005/0035699 A1 | 2/2005 | Tsai |
| 2005/0042117 A1 | 2/2005 | Lin |
| 2005/0046919 A1 | 3/2005 | Taguchi et al. |
| 2005/0046922 A1 | 3/2005 | Lin et al. |
| 2005/0057442 A1 | 3/2005 | Way |
| 2005/0078348 A1 | 4/2005 | Lin |
| 2005/0128565 A1 | 6/2005 | Ljungblad |
| 2005/0249966 A1 | 11/2005 | Tung et al. |
| 2005/0250235 A1 | 11/2005 | Miles et al. |
| 2005/0253820 A1 | 11/2005 | Horiuchi |
| 2006/0024880 A1 | 2/2006 | Chui et al. |
| 2006/0056001 A1 | 3/2006 | Taguchi et al. |
| 2006/0066511 A1 | 3/2006 | Chui |
| 2006/0077504 A1 | 4/2006 | Floyd |
| 2006/0077509 A1* | 4/2006 | Tung et al. .................. 359/260 |
| 2006/0077528 A1 | 4/2006 | Floyd |
| 2006/0077529 A1 | 4/2006 | Chui et al. |
| 2006/0091824 A1 | 5/2006 | Pate et al. |
| 2006/0094143 A1 | 5/2006 | Haluzak |
| 2006/0209386 A1 | 9/2006 | Sudak et al. |
| 2006/0261330 A1 | 11/2006 | Miles |
| 2007/0019280 A1 | 1/2007 | Sasagawa et al. |
| 2007/0103028 A1 | 5/2007 | Lewis et al. |
| 2007/0121205 A1 | 5/2007 | Miles |
| 2008/0093688 A1 | 4/2008 | Cummings et al. |
| 2008/0144163 A1 | 6/2008 | Floyd |
| 2008/0192328 A1 | 8/2008 | Chui |
| 2008/0192329 A1 | 8/2008 | Chui |
| 2008/0268620 A1 | 10/2008 | Floyd |
| 2009/0059345 A1 | 3/2009 | Tung et al. |

FOREIGN PATENT DOCUMENTS

| | | |
|---|---|---|
| CN | 157313 | 5/1991 |
| EP | 0 667 548 | 8/1995 |
| EP | 1 170 618 | 1/2002 |
| EP | 1 243 550 | 9/2002 |
| EP | 1 452 481 | 9/2004 |
| EP | 1 473 581 | 11/2004 |
| EP | 1 484 635 | 12/2004 |
| JP | 02-068513 | 3/1990 |
| JP | 06-281956 | 10/1994 |
| JP | 07-45550 | 2/1995 |
| JP | 09-036387 | 2/1997 |
| JP | 10-116996 | 5/1998 |
| JP | 11-243214 | 9/1999 |
| JP | 11-263012 | 9/1999 |
| JP | 2000-040831 | 2/2000 |
| JP | 2002-062505 | 2/2002 |
| JP | 2002-296521 | 10/2002 |
| JP | 2002-341267 | 11/2002 |
| JP | 2003-057571 | 2/2003 |
| JP | 2003195201 | 7/2003 |
| JP | 2005-051007 | 2/2005 |
| KR | 2002-9270 | 10/1999 |
| WO | WO 97/17628 | 5/1997 |
| WO | WO 99/34484 | 7/1999 |
| WO | WO 03/046508 | 6/2003 |
| WO | WO 03/052506 | 6/2003 |
| WO | WO 03/069404 | 8/2003 |
| WO | WO 2004/000717 | 12/2003 |
| WO | WO 2004/015741 | 2/2004 |
| WO | WO 2005/066596 | 7/2005 |
| WO | WO 2005/124869 | 12/2005 |

OTHER PUBLICATIONS

Aratani K. et al. "Surface Micromachined Tuneable Interferometer Array," Sensors and Actuators A, Elsevier Sequoia S.A., Lausanne, CH, vol. A43, No. 1/3, May 1, 1994, pp. 17-23.

Butler et al., "An Embedded Overlay Concept for Microsystems Packaging," IEEE Transactions on Advanced Packaging IEEE USA, vol. 23, No. 4, pp. 617-622, XP002379648 (2000).

Chu, et al. "Formation and Microstructures of Anodic Aluminoa Films from Aluminum Sputtered onglass Substrate" Journal of the Electrochemical Society, 149 (7) B321-B327 (2002).

Crouse, "Self-ordered pore structure of anodized aluminum on silicon and pattern transfer" Applied Physics Letters, vol. 76, No. 1, Jan. 3, 2000. pp. 49-51.

French, P.J. "Development of Surface Micromachining techniques compatable with on-chip electronics" Journal of Micromechanics and Microengineering vol. 6 No. 2, 197-211 XP 002360789 Jun. 1996 IOP Publishing.

Furneaux, et al. "The Formation of Controlled-porosity membranes from Anodically Oxidized Aluminium" Nature vo 337 Jan. 12, 1989, pp. 147-149.

Goossen et al., "Possible Display Applications of the Silicon Mechanical Anti-Reflection Switch," Society for Information Display (1994).

Hall, Integrated optical inteferometric detection method for micromachined capacitiive acoustic transducers, App. Phy. Let. 80:20(3859-3961) May 20, 2002.

Kawamura et al., Fabrication of fine metal microstructures packaged in the bonded glass substrates, Proceedings of SPIE, vol. 3893, pp. 486-493, 1999.

Kim et al., "Control of Optical Transmission Through Metals Perforated With Subwavelength Hole Arrays," Optic Letters, vol. 24, No. 4, pp. 256-258 (Feb. 1999).

Matsumoto et al., Novel prevention method of stiction using silicon anodization for SOI structure, Sensors and Actuators, 72:2(153-159) Jan. 19, 1999.

Watanabe et al., Reduction of microtrenching and island formation in oxide plasma etching by employing electron beam charge neutralization, Applied Physics Letters, 79:17(2698-2700), Oct. 22, 2001.

Xactix Xetch Product Information.

Xactix Xetch X# Specifications, http:—www.xactix.com-Xtech X3specs.htm, Jan. 5, 2005.

Hoivik et al. 2002. Atomic layer deposition of conformal dielectric and protective coatings for released micro-electromechanical devices, IEEE, pp. 455-458.

Hoivik et al. 2002. Atomic layer deposition (ALD) technology for reliable RF MEMS, IEEE, pp. 1229-1232.

* cited by examiner

US 7,652,814 B2

MEMS DEVICE WITH INTEGRATED OPTICAL ELEMENT

CROSS REFERENCE TO RELATED APPLICATIONS

This application claims priority to U.S. Provisional Application No. 60/762723, filed Jan. 27, 2006, which is incorporated by reference, in its entirety.

BACKGROUND

1. Field of the Invention

This invention relates generally to optical modulator devices and methods for making optical modulators, and more particularly to interferometric modulators used in displays.

2. Description of the Related Art

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed. In particular, it is desirable that an array of interferometric modulators presents a more uniformly dark or black appearance in the dark state for increased contrast.

SUMMARY

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

An embodiment provides a spatial light modulator that includes a substrate, an optical element over the substrate, a buffer layer over the optical element, and a light modulating element over the buffer layer, the light modulating element including a support directly aligned with the optical element.

Another embodiment provides a MEMS device that includes a substrate, an etalon over the substrate, at least one buffer layer over the etalon, and a light modulating element on the buffer layer, the light modulating element including a support aligned with the underlying etalon.

Another embodiment provides a method of making a MEMS device, including providing a substrate, fabricating an etalon on the substrate, forming at least one buffer layer over the etalon, and forming a support on the buffer layer, wherein the support is aligned with the underlying etalon. Another embodiment provides a MEMS device made by such a method.

Another embodiment provides a MEMS device that includes a means for transmitting or reflecting light, a means for modulating light transmitted through or reflected from the transmitting or reflecting means, a means for supporting at least a portion of the light modulating means over the transmitting or reflecting means, a means for absorbing at least a portion of the light transmitted through or reflected from the transmitting or reflecting means, and a means for separating the light absorbing means from the supporting means.

Another embodiment provides a MEMS display device that includes a substrate, a plurality of etalons on the substrate, at least one buffer layer over the plurality of etalons, and an array of interferometric modulators on the buffer layer, wherein the array includes a plurality of supports configured to align with the plurality of etalons.

These and other embodiments are described in greater detail below.

DETAILED DESCRIPTION

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

An embodiment is directed to a MEMS device with an optical element that is aligned with a support structure. The optical element may be an etalon that is capable of absorbing substantially all the visible light so the base of the support structure appears dark to a viewer. In another embodiment, the optical element (e.g., the etalon) absorbs a portion of the visible light so that it reflects a desired color. The light absorbing function of the optical element uses the principles of optical interference. The optical element is separated from the support structure by at least one buffer layer. In certain embodiments, the MEMS device is an interferometric modulator. The presence of these optical elements can increase the contrast of an interferometric modulator display by providing a more uniformly dark or black appearance (reducing the area of the display that is relatively bright) when the interferometric modulator is in a dark state. Similarly, brighter more vibrant colors that are not "washed out" by bright regions are provided when the interferometric modulator is in a bright state.

Figure 1:
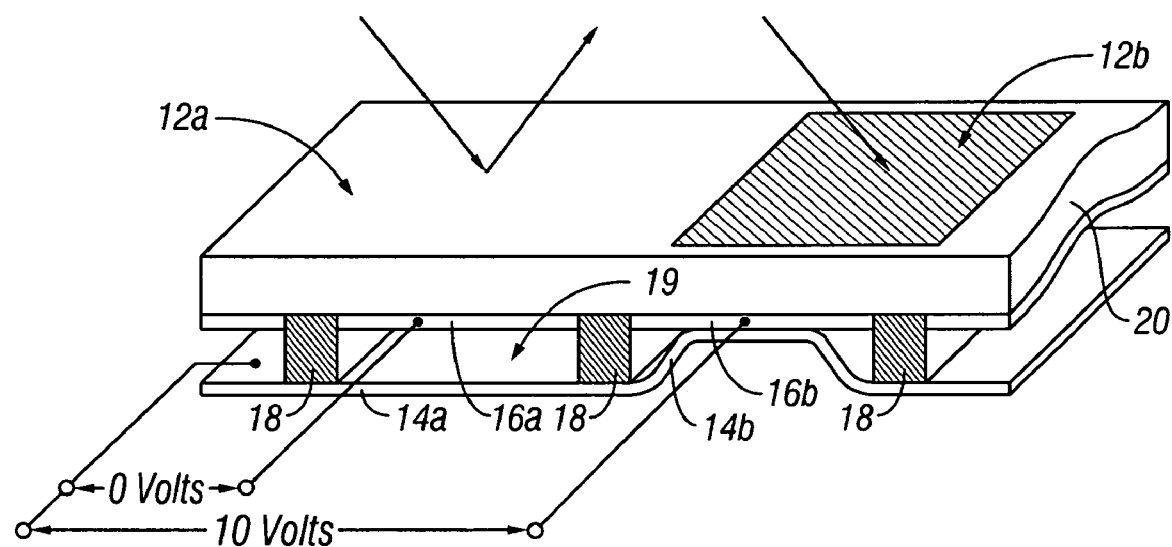
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise of several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some embodiments, the layers of the optical stack are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the cavity 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5B illustrate one exemplary process and system for using an array of interferometric modulators in a display application.

Figure 2:
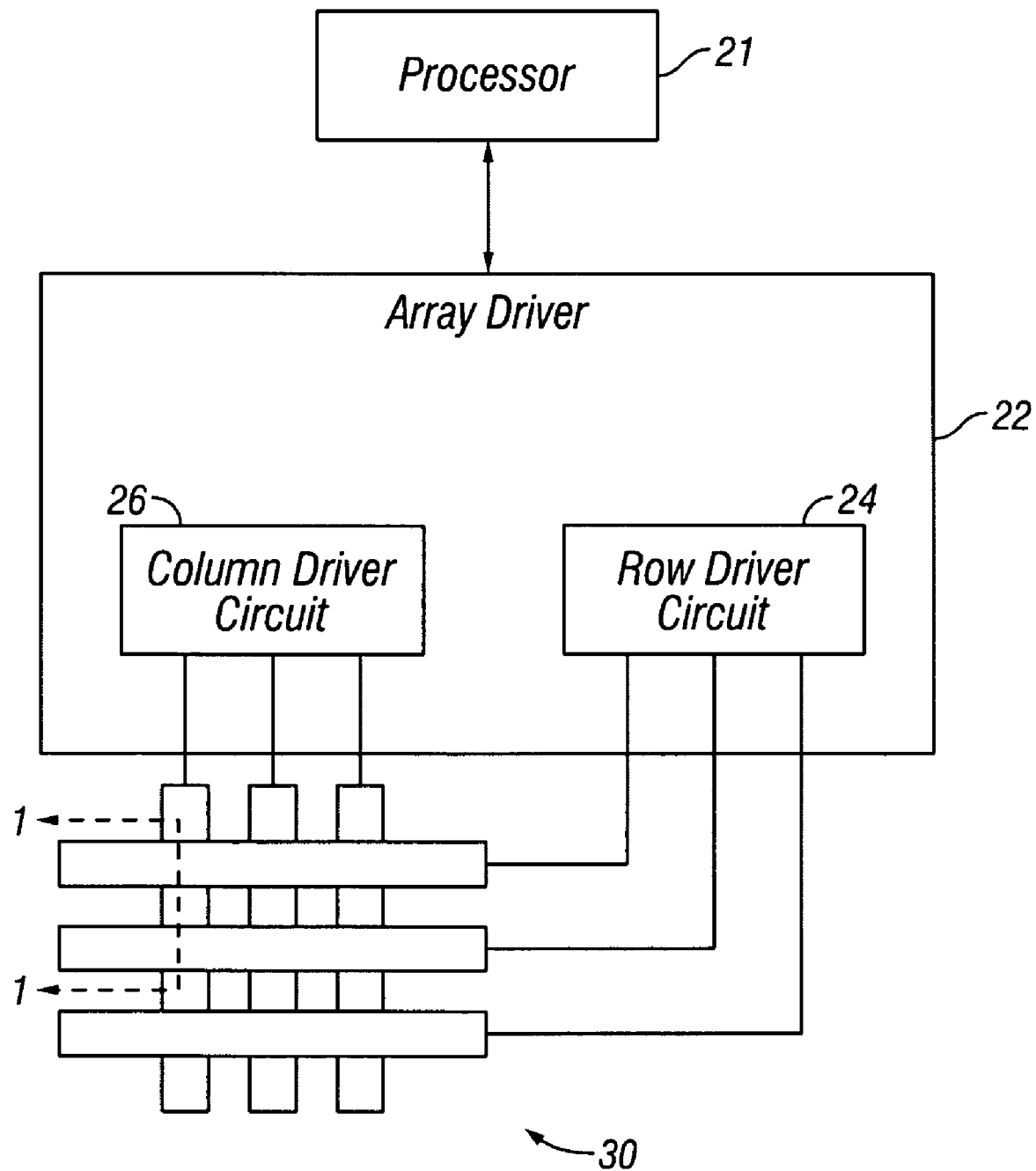
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
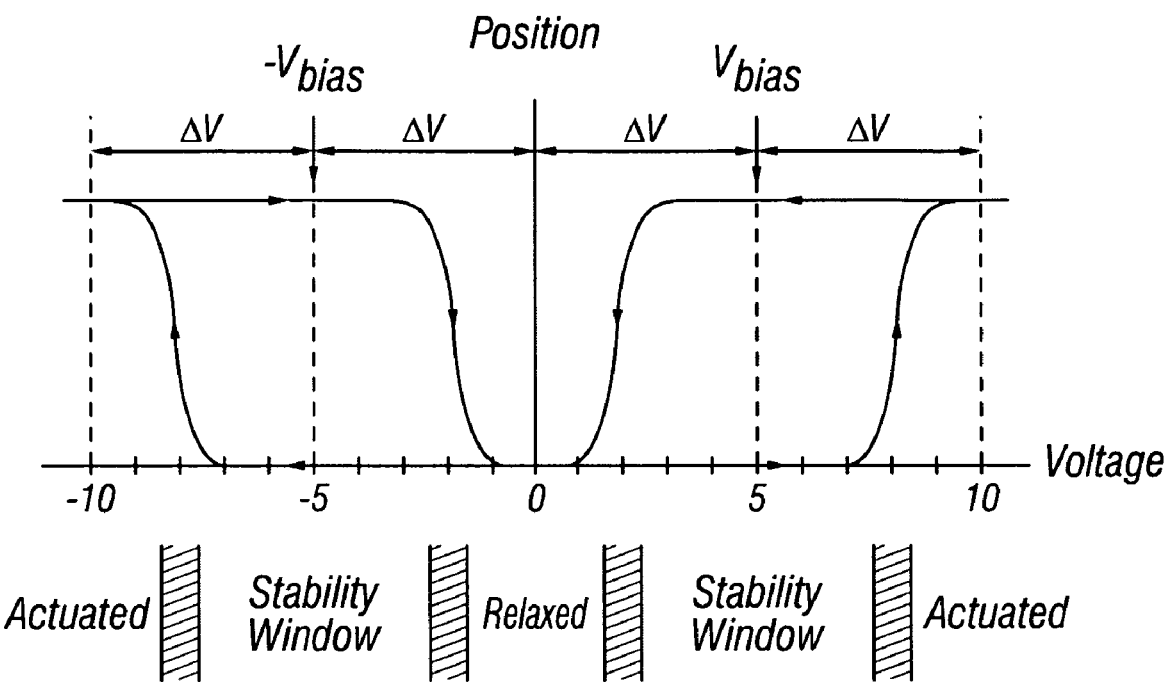
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.
Figure 5A:
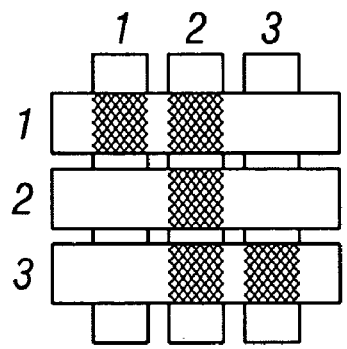
FIG. 5A illustrates one exemplary frame of display data in the 3×3 interferometric modulator display of FIG. 2.
Figure 5B:
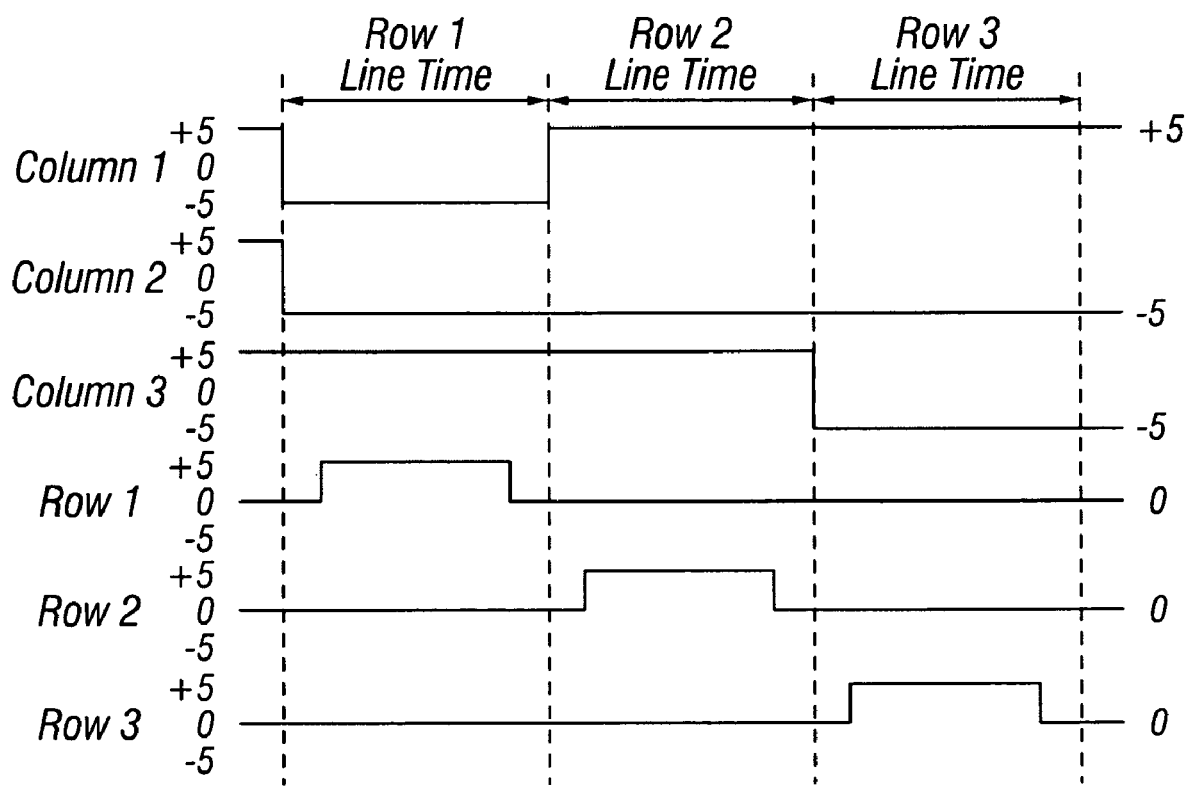
FIG. 5B illustrates one exemplary timing diagram for row and column signals that may be used to write the frame of FIG. 5A.

FIGS. 4, 5A, and 5B illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
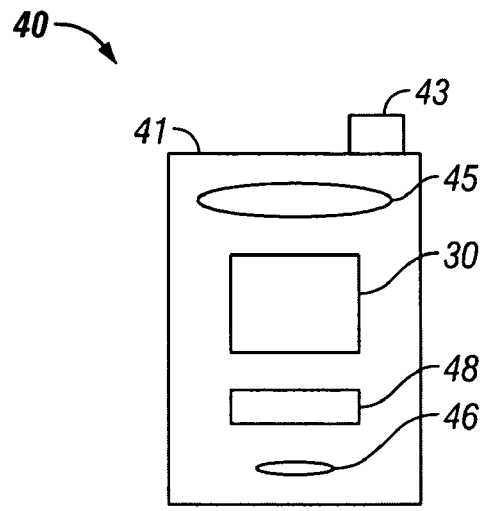
FIGS. 6A and 6B are system block diagrams illustrating an embodiment of a visual display device comprising a plurality of interferometric modulators.
Figure 6B:
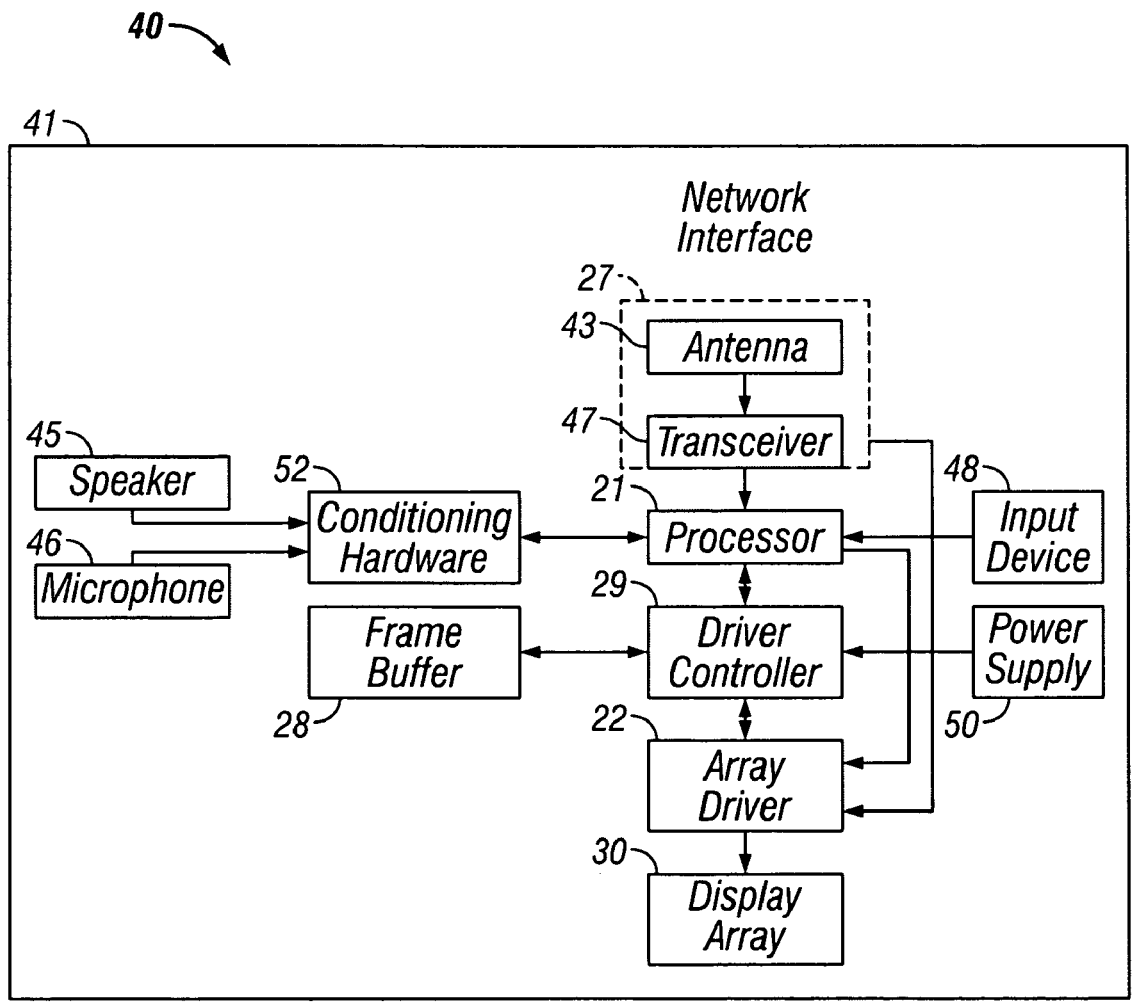

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 44, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one ore more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a memory device such as a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. Those of skill in the art will recognize that the above-described optimization may be implemented in any number of hardware and/or software components and in various configurations.

Figure 7A:
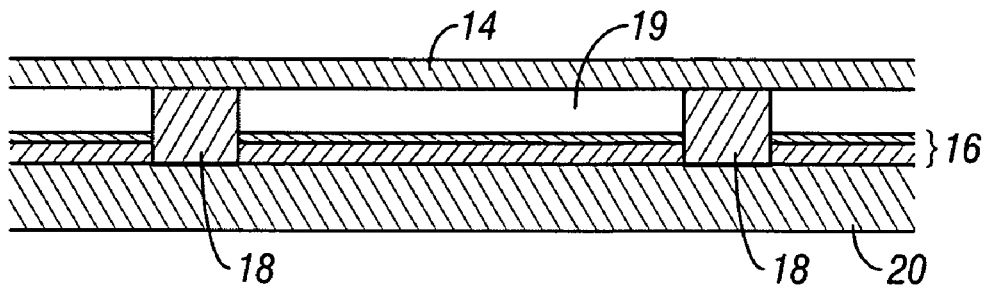
FIG. 7A is a cross section of the device of FIG. 1.
Figure 7B:
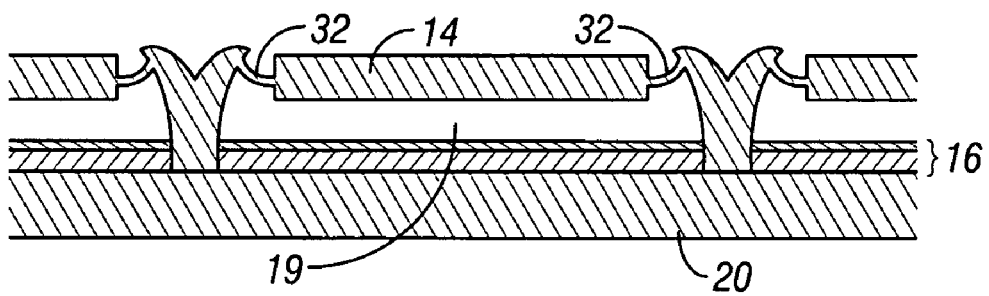
FIG. 7B is a cross section of an alternative embodiment of an interferometric modulator.
Figure 7C:
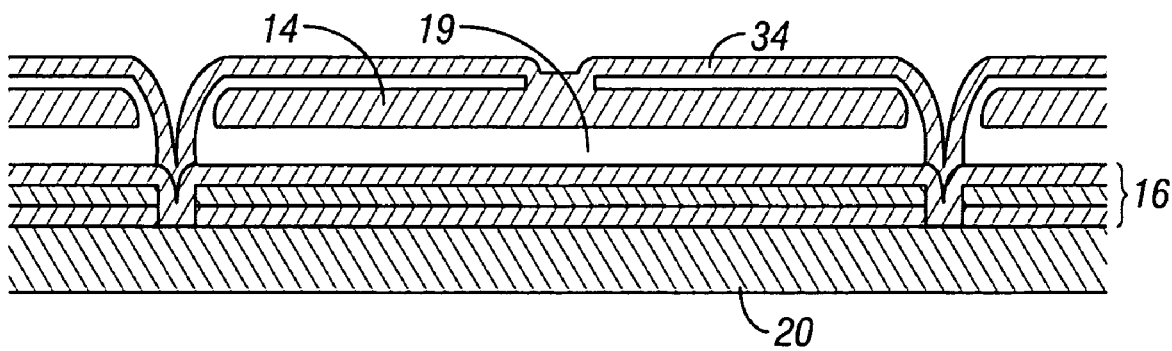
FIG. 7C is a cross section of another alternative embodiment of an interferometric modulator.
Figure 7D:
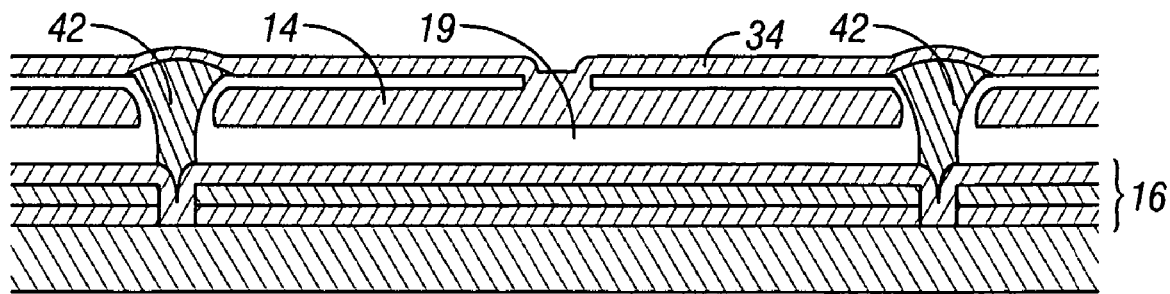
FIG. 7D is a cross section of yet another alternative embodiment of an interferometric modulator.
Figure 7E:
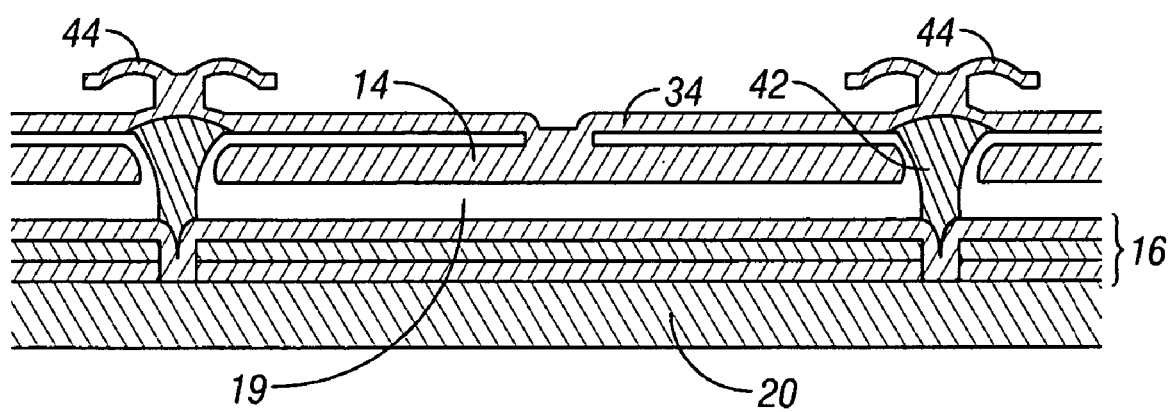
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support or support posts. The embodiment illustrated in FIG. 7D has support post plugs 42 upon which the deformable layer 34 rests. The movable reflective layer 14 remains suspended over the cavity, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the MEMS devices (e.g., interferometric modulators) function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. Such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties. The production of various types of interferometric devices is described in a variety of published documents, including, for example, U.S. Published Application 2004/0051929. A wide variety of well known techniques may be used to produce the above described structures involving a series of material deposition, patterning, and etching steps.

Interferometric modulators of the general design discussed above comprise at least one support structure (e.g., post 18 in FIGS. 1 and 7). A "support," "post" or "post structure" is a structure located at the side or corner of an interferometric cavity (or between adjoining interferometric cavities) that supports an electrode (and/or mirror) and/or maintains or helps to maintain a desired distance between electrodes (and/or mirrors). Accordingly, the support may be adjacent an open region and may be an orthogonally extending support (e.g., support 18). As described above, the electrode or mirror supported by the support may comprise a flexible member that flexes in the open region in the interferometric modulator with application of an electric field in the cavity. Supports typically have a width of about 3 to about 15 microns, although the width of the support may be outside this range. The shape of the support may vary as well. The support may have a height that corresponds approximately to the cavity height (e.g., the spacing between the upper and lower mirrors). The height of the support, however, may be larger or smaller. For example, the support may be formed on a layer of material or on a pedestal and thus be raised to a level above the lower mirror. Similarly, the support may extend to a height higher than the upper mirror or to a depth lower than the lower mirror. See, e.g., FIG. 7C which shows the upper mirror attached to an electrode held up by the support. Supports may be formed from various materials (e.g., metals, silicon oxide, metal oxides, polymers, etc.) having optical properties that may differ significantly from one another. In some cases, these materials may reflect light in an undesirable way, e.g., in such a way that the contrast is reduced.

The configuration of the support and the material(s) from which it is constructed may significantly affect the performance of the interferometric modulator. By forming a light absorbing optical element (e.g., dark etalon or black mask) over a portion of the substrate to allow the post to appear dark or black as seen by a viewer, one can improve the contrast ratio of a MEMS device. Alternatively, the optical element (e.g., colored etalon) may also be configured to absorb a selected wavelength or range of wavelengths, so it appears as a certain color as seen by the viewer. The optical element or etalon is therefore a means for absorbing light transmitted through the transmitting means (e.g., transparent substrate). The light absorbing means uses the principles of optical interference so that it may appear dark or a certain color to a viewer. To increase the contrast of a MEMS device with a black background, the optical element can be configured to absorb substantially all the visible light, so it appears dark to a viewer. In some embodiments, the background of the MEMS device may have a different color. The optical element may be configured to absorb a selected wavelength or range of wavelengths of the visible light, so the posts of interferometric modulators appear to be the same color as the background.

Figure 8A:
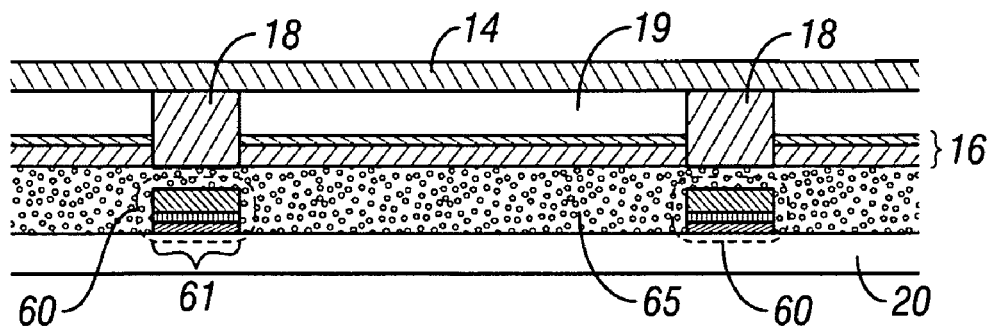
FIG. 8A is a cross section of an embodiment of an interferometric modulator with optical elements.
Figure 8B:
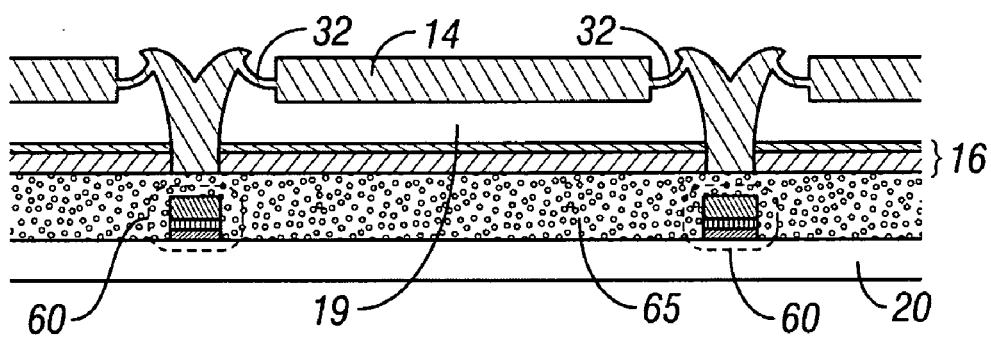
FIG. 8B is a cross section of an alternative embodiment of an interferometric modulator with optical elements.
Figure 8C:
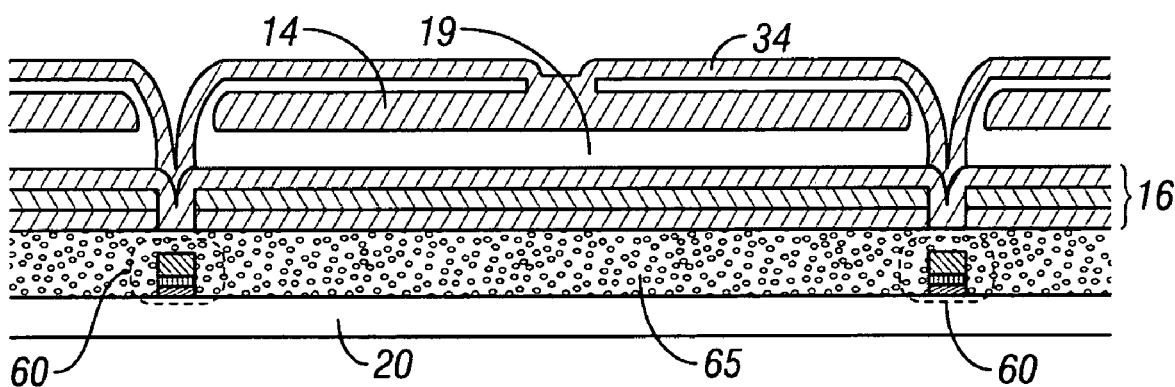
FIG. 8C is a cross section of another alternative embodiment of an interferometric modulator with optical elements.

FIGS. 8A to 8E illustrate several embodiments of MEMS devices that are generally similar to the embodiments illustrated in FIGS. 7A-7D. However, the embodiments of FIGS. 8A to 8E comprise an optical element 60 (e.g., an etalon in the illustrated embodiment) over the substrate 20 and at least one buffer layer 65 over the optical element 60. The light modulating element, e.g., formed by the optical stack 16 and the moveable layer 14, comprises a support (e.g., support 18 in FIG. 8A or support post plug 42 in FIGS. 8D and 8E) aligned with the underlying optical element 60. The contacting area where the support contacts the buffer layer 65 is about the same size as the cross-sectional area of the optical element 60. For example, as illustrated in FIG. 8A, the support 18 contacts the buffer layer 65 in an area 61 that is about the same size as the cross-sectional area of the etalon 60. The light modulating element (e.g., interferometric modulator) may comprise an optical stack 16, a movable layer 14, and a cavity 19 separating the optical stack 16 from the movable layer 14 as illustrated in FIGS. 8A-8E. The light modulating element is a means for modulating light transmitted through or reflected from the transmitting or reflecting means (e.g., transparent substrate 20).

The optical element 60 may be an etalon (Farbry-Perot interferometer), which comprises a first reflective layer, a second reflective layer, and a dielectric layer sandwiched between the first and the second reflective layers. The reflective layers may each comprise a metal. With reference to FIGS. 10 and 11, the first reflective layer (e.g., absorber 62) of the etalon 60 comprises at least a material that is capable of absorbing incident light and/or visible light, preferably chromium or molybdenum chromium alloy, and preferably has a thickness from about 60 to about 80 angstroms. The dielectric layer 64 can be any dielectric material (e.g., $Si_xN_y$, $SiO_xN_y$, $SiO_2$ or amorphous silicon) with a dielectric constant and a thickness selected to generate an interferometric black state or a desired colored state. An etalon embodiment may have a silicon oxide dielectric layer with a thickness of about 700 to about 800 Å, and preferably about 750 to about 760 Å. Another etalon embodiment may have a silicon nitride dielectric layer with a thickness of about 350 to about 470 Å, preferably about 400 to about 420 Å. The thickness of the dielectric layer depends on the refractive index of the dielectric layer and the desired appearance (e.g., colored or black), and may be selected using known principles of interferometry in light of the guidance provided herein. The second reflective layer (e.g., reflector 66) may comprise a reflective material such as a metal or an alloy, and is preferably aluminum or aluminum alloy. The thickness of the second reflective layer 66 may be from about 200 to about 300 angstroms. In one embodiment, the second reflective layer 66 is fully reflective. A skilled artisan would understand that fully reflective means reflecting substantially all the visible light. All layers may be formed by any suitable deposition techniques or semiconductor fabrication techniques, e.g., physical vapor deposition (PVD, e.g., sputtering), plasma-enhanced chemical vapor deposition (PECVD), thermal chemical vapor deposition (thermal CVD), spin-coating, ion implantation, ion-beam deposition, or pulse laser deposition (PLD). The optical element 60 (e.g., etalon) is a means for absorbing at least a portion of the light transmitted through or reflected from the transmitting or reflecting means (e.g., transparent substrate).

As illustrated in FIGS. 8A-8E and 12C, the optical element 60 is embedded in a buffer layer 65 over the substrate 20. The light modulating element (comprising an optical stack 16, a movable layer 14, and a cavity 19 separating the optical stack 16 from the movable layer 14) is over the buffer layer 65. As a portion of the buffer layer 65 is over the optical element 60, the optical element 60 is also electrically insulated from the support 18 and does not provide electrical path or connection to the light modulating element. The optical stack 16 typically comprises at least one electrically conductive layer. In some embodiments, an electrically conductive layer of the optical stack 16 is on the buffer layer 65.

Figure 8D:
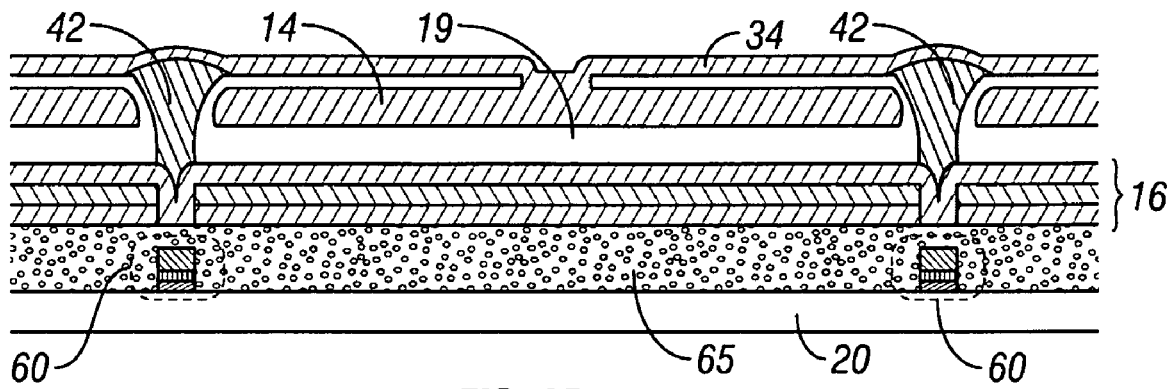
FIG. 8D is a cross section of yet another alternative embodiment of an interferometric modulator with optical elements.
Figure 8E:
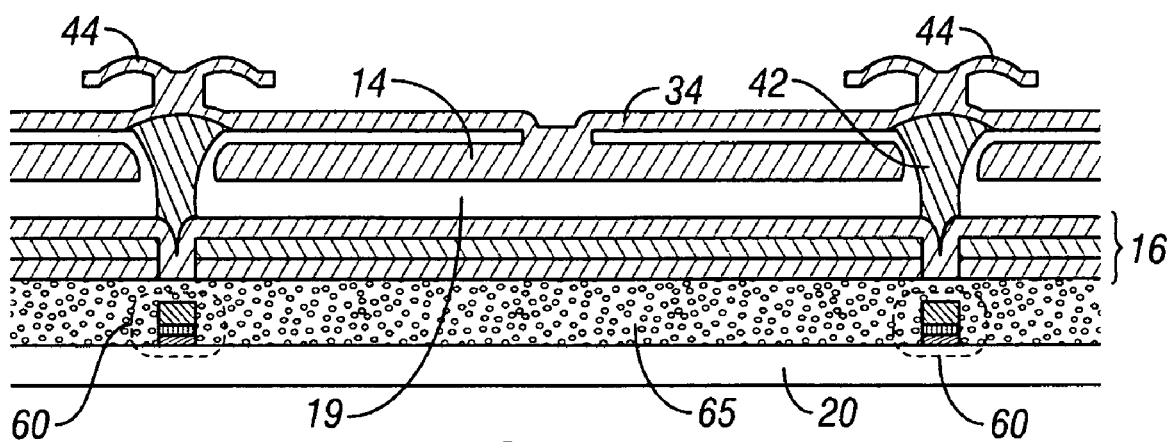
FIG. 8E is a cross section of an additional alternative embodiment of an interferometric modulator with optical elements.
Figure 9:
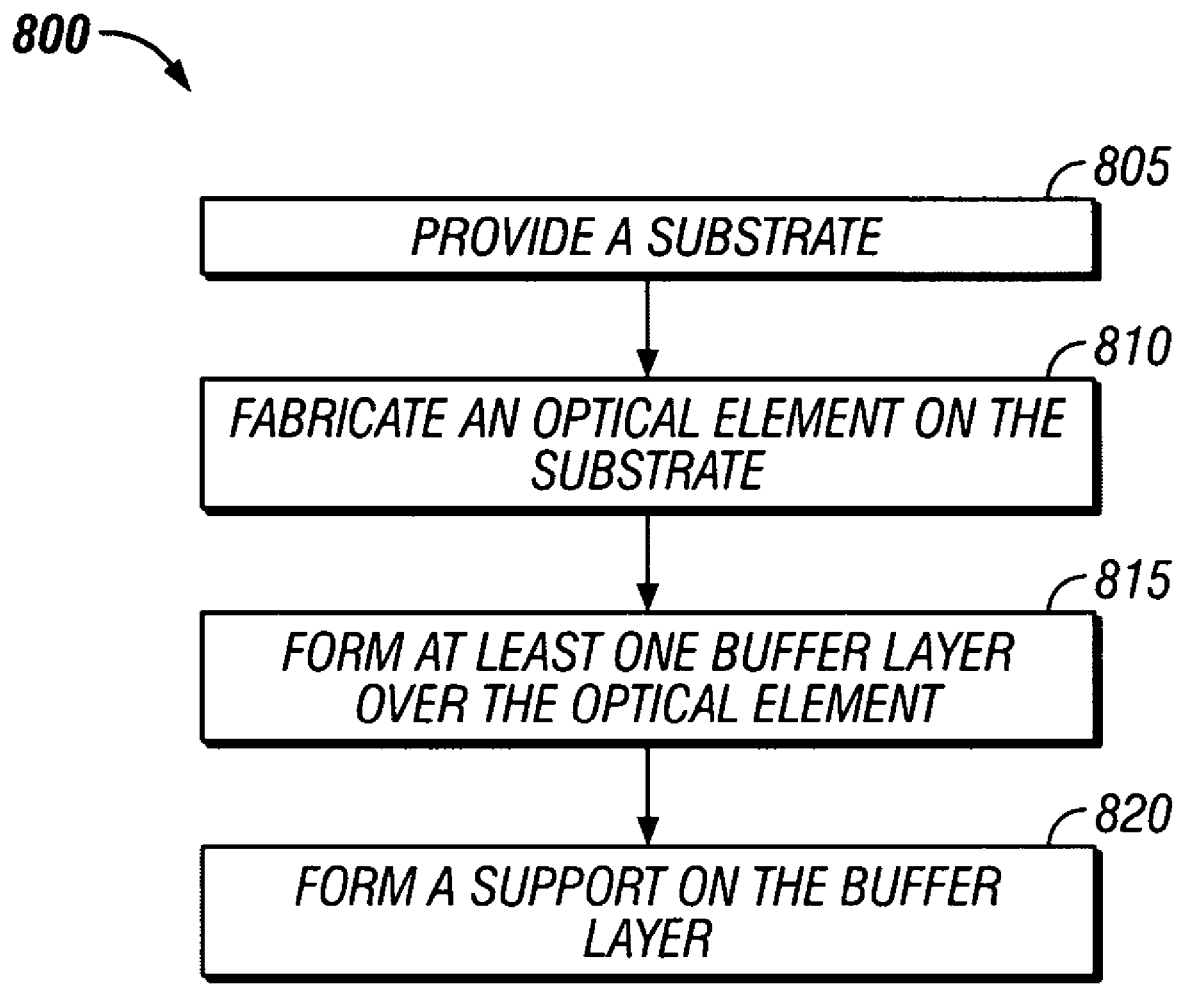
FIG. 9 shows a flow chart illustrating an embodiment of a process for making a MEMS device with a support over an etalon.

FIG. 9 illustrates certain steps in an embodiment of a manufacturing process 800 for a MEMS device having an optical element aligned with a support structure. The steps in such a method 800 may be carried out using semiconductor fabrication techniques known to those skilled in the art. With reference to FIGS. 8 and 9, the process 800 begins at step 805 wherein a substrate (e.g., a transparent substrate 20) is provided. Typically the transparent substrate 20 is glass, plastic or other material that is transparent to light, yet can support fabrication of an interferometric modulator array. Those skilled in the art will appreciate that the term "transparent" as used herein encompasses materials that are substantially transparent to the operational wavelength(s) of the interferometric modulator, and thus transparent substrates need not transmit all wavelengths of light and may absorb and/or reflect a portion of the light at the operational wavelength(s) of the interferometric modulator. The transparent substrate is a means for transmitting or reflecting light.

Figure 10A:
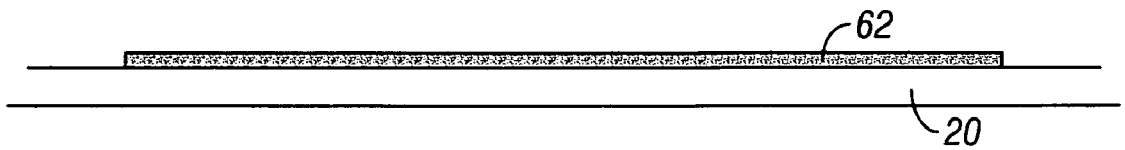
FIGS. 10A to 10E illustrate various steps in an embodiment of a dual mask method for making an interferometric modulator with optical elements.
Figure 10B:
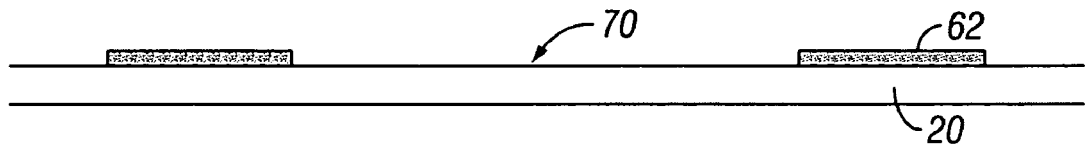
Figure 10C:
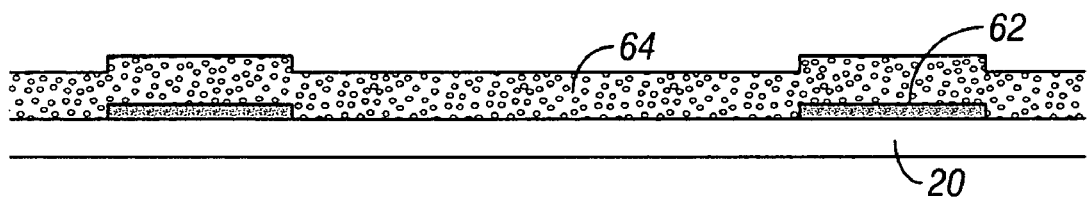
Figure 10D:
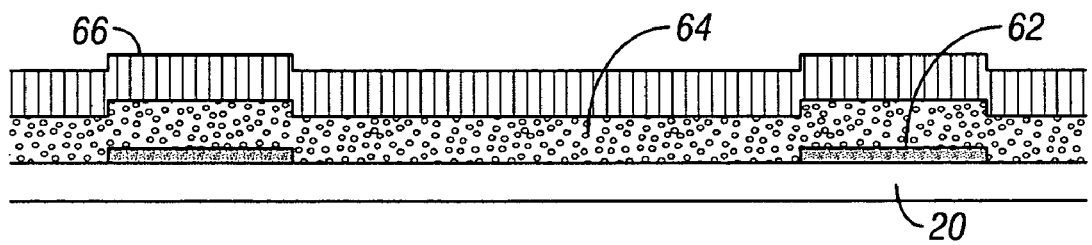
Figure 10E:
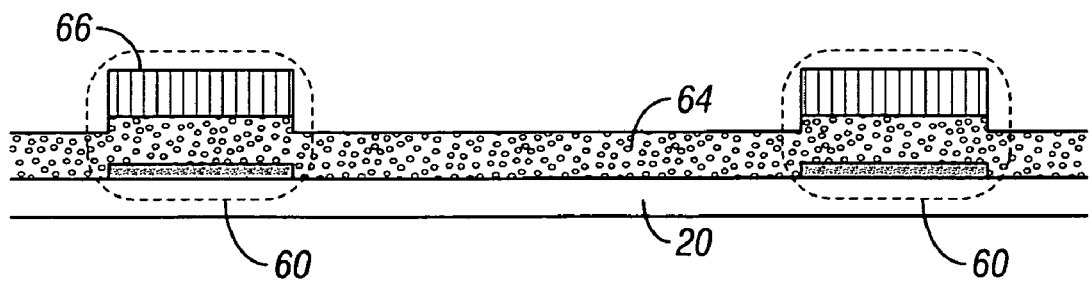

The process 800 continues at step 810 with the fabrication of an optical element (e.g., etalon 60) on or over the substrate 20. FIGS. 10A to 10E illustrate one embodiment wherein the etalon 60 is fabricated using a dual mask process. In the illustrated embodiment, fabricating the etalon 60 comprises depositing a first reflective layer 62 (e.g., absorber) on at least a portion of the substrate 20 (FIG. 10A), removing a portion of the first reflective layer 62 to form a recess 70 (FIG. 10B), depositing a dielectric layer 64 over the first reflective layer 62 and over the first recess 70 (FIG. 10C), depositing a second reflective layer 66 (e.g., reflector) over the dielectric layer 64 (FIG. 10D), and removing a portion of the second reflective layer 66 from over the recess 70 (FIG. 10E). All depositions may be carried out using any suitable deposition techniques such as PVD (e.g., sputtering), PECVD, thermal CVD, spin-coating, ion implantation, ion-beam deposition, or PLD. Removing a portion of the first reflective layer and a portion of the second reflective layer may comprise patterning, masking, and/or etching steps such as those known to those skilled in the art. The patterning step may comprise techniques such as photolithography or electron beam lithography and image transfer.

Figure 11A:
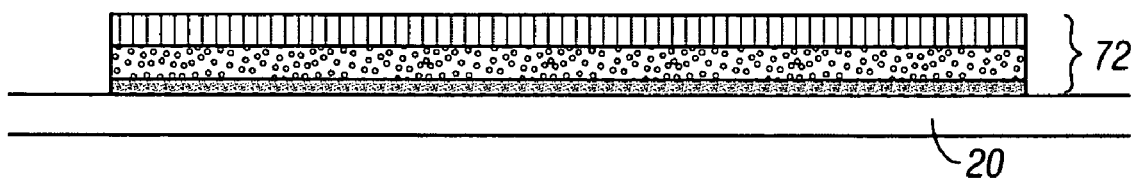
FIGS. 11A and 11B illustrate steps in an embodiment of a method of fabricating etalons over a substrate using a single mask method.
Figure 11B:
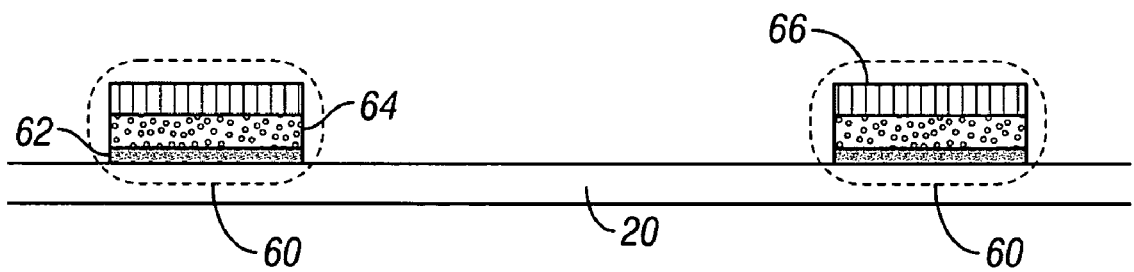

Another embodiment provides a single mask method for fabricating an etalon 60 as illustrated in FIGS. 11A and 11B. Fabricating the etalon 60 comprises forming a sandwich stack 72 over a portion of the substrate 20, wherein the sandwich stack 72 comprises a first reflective layer 62, a second reflective layer 66, and a dielectric layer 64 between the first and second reflective layers 62 and 66 (FIG. 11A), and removing a portion of the sandwich stack 72 (FIG. 11B). Similarly, the deposition of each layer comprises using any suitable deposition techniques such as PVD, sputtering, PECVD, thermal CVD, spin-coating, ion implantation, ion-beam deposition, or PLD. Removing a portion of the sandwich stack 72 may comprise patterning, masking, and/or etching steps. The patterning step may comprise techniques such as photolithography or electron beam lithography and image transfer. This embodiment may offer an advantage over the dual mask technique because no alignment is required during the patterning step.

Figure 12A:
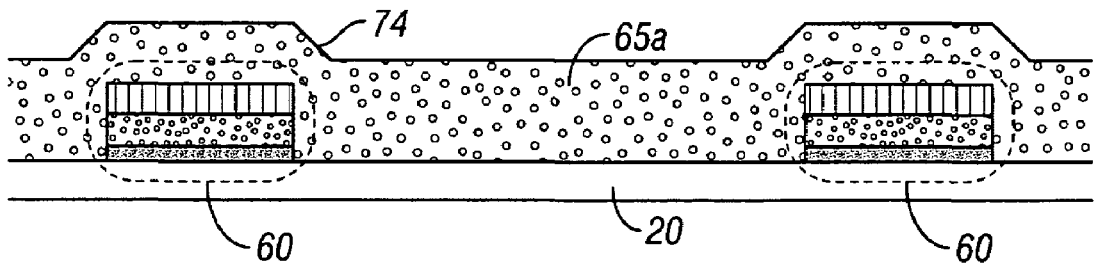
FIGS. 12A to 12C illustrate various steps in an embodiment of a method of forming a buffer layer over an etalon.
Figure 12B:
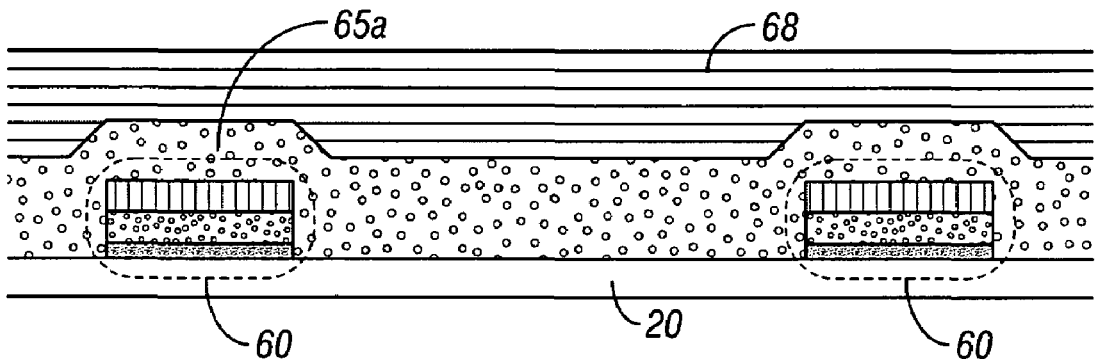
Figure 12C:
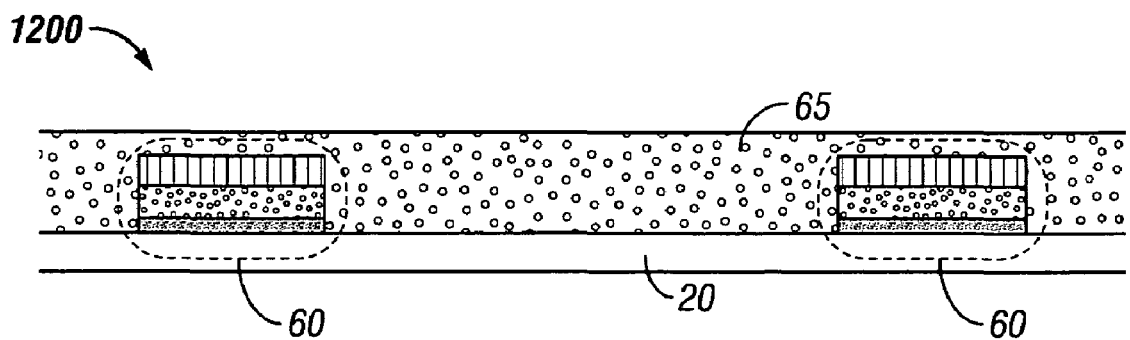

The process 800 continues at step 815 by forming at least one buffer layer 65 over the optical element (e.g., etalon 60) as illustrated in FIG. 12A. In some embodiments, the buffer layer 65 may comprise a dielectric material such as $SiO_2$, $SiO_xN_y$, or $Si_xN_y$, with a thickness in the range of about 100 Å to about 10,000 Å, e.g., a thickness of about 5,000 Å. The buffer layer 65 may or may not comprise the same dielectric material as the dielectric layer 64 in the etalon 60. As depicted in FIG. 12A, the deposition of the buffer layer 65a over the etalon 60 and a portion of the substrate 20 results in step edges 74 on the top surface. Optionally, a planarization and etch back procedure may be performed to provide a flat surface for subsequent processes. For example, in the illustrated embodiment, forming the buffer layer 65 comprises depositing an initial buffer layer 65a on or over the etalon 60 (FIG. 12A), forming a planarization layer 68 on the initial buffer layer 65a (FIG. 12B), and removing the planarization layer 68 and a part of the initial buffer layer 65a to form the buffer layer 65 (FIG. 12C), thereby forming a base structure 1200. Removing the planarization layer 68 and the part of the initial buffer layer 65a may comprise etching to form a buffer layer 65 that is substantially flat as illustrated in FIG. 12C. In some embodiments the planarization material 68 can be a photoresist or a polymer. A preferred etching procedure is capable of removing both the planarization material 68 and the buffer layer material 65 at about the same rate. The buffer layer 65 may be used to isolate or separate the etalon 60 from the subsequently formed MEMS device components. Thus, the buffer layer 65 is a means for separating the light absorbing means (e.g., etalon 60) from the supporting means (e.g., support or post 18). In other embodiments (not shown), subsequently formed MEMS device components (such as the support) are fabricated over the step edges 74 of the buffer layer 65a, without planarization. In some preferred embodiments, the buffer layer 65 provides improved reliability by preventing electrical leakage. In another preferred embodiment, the presence of buffer layer 65 can also simplify the fabrication process of MEMS devices with embedded optical elements by eliminating step coverage problems.

The process 800 continues at step 820 by forming a support on the buffer layer 65. The support is configured to be aligned with the underlying optical element (e.g., etalon 60). The support may comprise a post 18, a support post plug 42, or any structure capable of supporting or suspending the movable reflective layer 14 over the cavity 19 and the substrate 20 as illustrated in FIG. 8. The support (e.g., post 18) is a means for supporting at least a portion of the light modulating means (e.g., interferometric modulator) over the transmitting or reflecting means (e.g., transparent substrate). At least one buffer layer 65 separates the optical element (e.g., etalon 60) from the light modulating element. The support is a part of the light modulating element (e.g., interferometric modulator) and is fabricated over the buffer layer 65. Suitable deposition and photolithography techniques can be used to fabricate and align the support over the optical element or etalon 60.

For example, the support may be a post 18 formed during the subsequent fabrication of an interferometric modulator.

Figure 13:
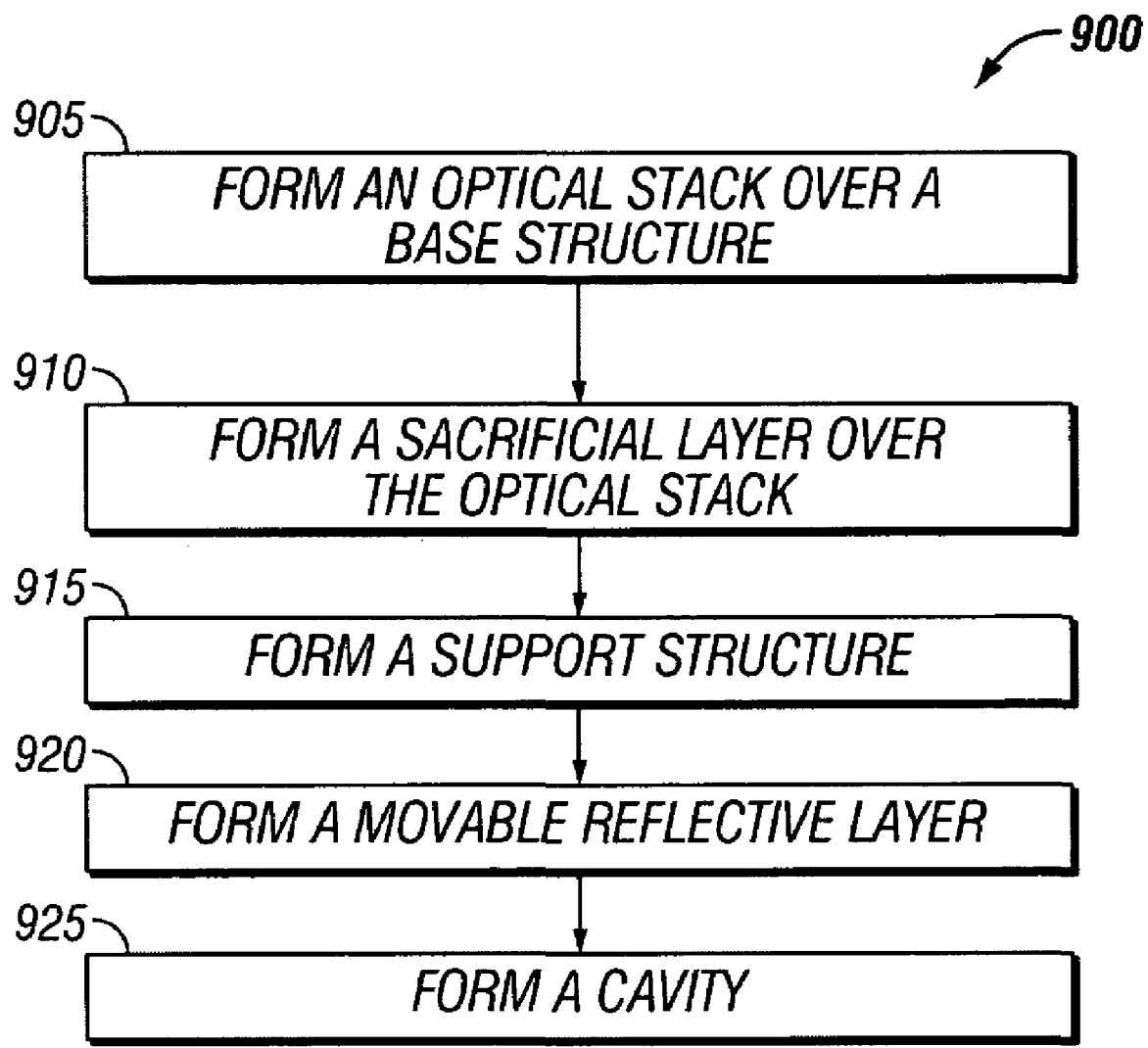
FIG. 13 shows a flow chart illustrating an embodiment of a manufacturing process 900 for a light modulating element.

FIG. 13 illustrates certain steps in an embodiment of a manufacturing process 900 for a light modulating element (e.g., interferometric modulator of the general type illustrated in FIGS. 8A to 8E). With reference to FIGS. 8, 12 and 13, the process 900 begins at step 905 with the formation of the optical stack 16 over the base structure 1200. The base structure 1200 comprises at least a buffer layer 65 over the second reflective layer 66 of the optical element 60. The base structure 1200 may have been subjected to prior preparation step(s), e.g., cleaning, to facilitate efficient formation of the optical stack 16. As discussed above, the optical stack 16 is electrically conductive, partially transparent and partially reflective, and may be fabricated, for example, by depositing one or more of the layers onto the base structure 1200. Therefore in some embodiments, the conductive layer of the optical stack 16 is deposited on at least one buffer layer 65 over the second reflective layer 66. In some embodiments, the layers of the optical stack 16 are patterned into parallel strips, and may form row electrodes in a display device. In some embodiments, the optical stack 16 comprises an insulating or dielectric layer that is deposited over one or more metal layers (e.g., reflective and/or conductive layers). In other embodiments, the interferometric modulator with optical element may comprise a conductive layer that is deposited on or over the buffer layer 65 of the base structure 1200, wherein the conductive layer is one of the layers of the optical stack 16.

The process 900 illustrated in FIG. 13 continues at step 910 with the formation of a sacrificial layer over the optical stack 16. The sacrificial layer is later removed (e.g., at step 925) to form the cavity 19 as discussed below and thus the sacrificial layer is not shown in the resulting interferometric modulator embodiments illustrated in FIG. 8. The formation of the sacrificial layer over the optical stack 16 may include deposition of a $XeF_2$-etchable material such as molybdenum or amorphous silicon, in a thickness selected to provide, after subsequent removal, a cavity 19 having the desired size. Deposition of the sacrificial material may be carried out using deposition techniques such as PVD (e.g., sputtering), PECVD, thermal CVD, or spin-coating.

The process 900 illustrated in FIG. 13 continues at step 915 with the formation of a support structure e.g., a post 18 as illustrated in FIG. 8A. The formation of the post 18 may include the steps of patterning the sacrificial layer to form a support structure aperture, then depositing a material (e.g., polymer) into the aperture to form the post 18, using a deposition method such as PECVD, thermal CVD, or spin-coating. In some embodiments, the support structure aperture formed in the sacrificial layer extends through both the sacrificial layer and the optical stack 16 to the underlying base structure 1200, so that the lower end of the post 18 contacts the buffer layer 65 as illustrated in FIG. 8A. In other embodiments, the aperture formed in the sacrificial layer extends through the sacrificial layer, but not through the optical stack 16. For example, FIG. 8D illustrates the lower end of the support post plug 42 in contact with the optical stack 16.

The process 900 illustrated in FIG. 13 continues at step 920 with the formation of a movable reflective layer such as the movable reflective layer 14 illustrated in FIG. 8. The movable reflective layer 14 may be formed by employing one or more deposition steps, e.g., reflective layer (e.g., aluminum or aluminum alloy) deposition, along with one or more patterning, masking, and/or etching steps. As discussed above, the movable reflective layer 14 is typically electrically conductive, and may be referred to herein as an electrically conductive layer. Since the sacrificial layer is still present in the partially fabricated interferometric modulator formed at step 920 of the process 900, the movable reflective layer 14 is typically not movable at this stage. A partially fabricated interferometric modulator that contains a sacrificial layer may be referred to herein as an "unreleased" interferometric modulator.

The process 900 illustrated in FIG. 13 continues at step 925 with the formation of a cavity, e.g., a cavity 19 as illustrated in FIG. 8. The cavity 19 may be formed by exposing the sacrificial material (deposited at step 910) to an etchant. For example, an etchable sacrificial material such as molybdenum or amorphous silicon may be removed by dry chemical etching, e.g., by exposing the sacrificial layer to a gaseous or vaporous etchant, such as vapors derived from solid xenon difluoride ($XeF_2$) for a period of time that is effective to remove the desired amount of material, typically selectively relative to the structures surrounding the cavity 19. Other etching methods, e.g. wet etching and/or plasma etching, may also be used. Since the sacrificial layer is removed during step 925 of the process 900, the movable reflective layer 14 is typically movable after this stage. After removal of the sacrificial material, the resulting fully or partially fabricated interferometric modulator may be referred to herein as a "released" interferometric modulator.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. A spatial light modulator comprising:
a substrate;
an optical element over the substrate, wherein the optical element is an etalon;
a buffer layer over the optical element; and
a light modulating element over the buffer layer, wherein the light modulating element comprises an optical cavity and a support, wherein the support is entirely over and directly aligned with the optical element;
wherein the height of the support corresponds approximately to the height of the cavity; and
wherein the optical element is separated from the support by the buffer layer.

2. An electromechanical systems device comprising:
a substrate;
an etalon over the substrate;
at least one buffer layer over the etalon; and
a light modulating element on the buffer layer, wherein the light modulating element comprises an optical cavity and a support, wherein the support is entirely over and aligned with the underlying etalon;
wherein the height of the support corresponds approximately to the height of the cavity; and
wherein the etalon is electrically insulated from the light modulating element.

3. The electromechanical systems device of claim 2, wherein the etalon comprises a first reflective layer, a second reflective layer, and a dielectric layer sandwiched between the first and the second reflective layers.

4. The electromechanical systems device of claim 3, wherein the second reflective layer is fully reflective.

5. The electromechanical systems device of claim 3, wherein the first and the second reflective layers each comprises a metal.

6. The electromechanical systems device of claim 2, wherein the buffer layer comprises a dielectric material.

7. The electromechanical systems device of claim 2 further comprising a conductive layer on top of the buffer layer.

8. The electromechanical systems device of claim 2, wherein the light modulating element comprises an interferometric modulator.

9. The electromechanical systems device of claim 8, wherein the interferometric modulator comprises an optical stack, a movable layer, and the optical cavity separating the optical stack from the movable layer.

10. The electromechanical systems device of claim 2, wherein the support contacts the buffer layer in an area that is about the same size as the cross-sectional area of the etalon.

11. The electromechanical systems device of claim 2, wherein the support comprises a post.

12. A method of making an electromechanical systems device, comprising:
providing a substrate;
fabricating an etalon on the substrate;
forming at least one buffer layer over the etalon;
forming a support on the buffer layer, wherein the support is entirely over and aligned with the underlying etalon;
forming a first reflective layer on the buffer layer;
forming a second reflective layer over the first reflective layer; and
forming a cavity between the first reflective layer and the second reflective layer, wherein the second reflective layer is supported over the first reflective layer by the support;
wherein the height of the support corresponds approximately to the height of the cavity.

13. The method of claim 12, wherein fabricating the etalon comprises:
forming a sandwich stack over a portion of the substrate, wherein the sandwich stack comprises a first reflective layer, a second reflective layer, and a dielectric layer between the first and second reflective layers; and
removing a portion of the sandwich stack.

14. The method of claim 12, wherein fabricating the etalon comprises:
depositing a first reflective layer on at least a portion of the substrate;
removing a portion of the first reflective layer to form a recess;
depositing a dielectric layer over the first reflective layer and over the recess;
depositing a second reflective layer over the dielectric layer; and
removing at least a portion of the second reflective layer from over the recess.

15. The method of claim 12, wherein forming at least one buffer layer comprises:
depositing a dielectric layer on the etalon;
forming a planarization layer on the dielectric layer; and
removing the planarization layer and a part of the dielectric layer.

16. The method of claim 15, wherein removing the planarization layer and the part of the dielectric layer comprises etching to form a substantially flat buffer layer.

17. An electromechanical systems device made by the method of claim 12.

18. An electromechanical systems device comprising:
a means for transmitting or reflecting light;
a means for modulating light transmitted through or reflected from the transmitting or reflecting means;

a means for supporting at least a portion of the light modulating means over the transmitting or reflecting means;

a means for absorbing at least a portion of the light transmitted through or reflected from the transmitting or reflecting means; and a means for separating the light absorbing means from the supporting means.

19. The electromechanical systems device of claim 18, wherein the transmitting or reflecting means comprises a substrate.

20. The electromechanical systems device of claim 18, wherein the light modulating means comprises an interferometric modulator.

21. The electromechanical systems device of claim 18, wherein the supporting means comprises a post.

22. The electromechanical systems device of claim 18, wherein the light absorbing means comprises an etalon.

23. The electromechanical systems device of claim 18, wherein the separating means comprises one or more dielectric layers.

24. An electromechanical systems display device comprising:

a substrate;

a plurality of etalons on the substrate;

at least one buffer layer over the plurality of etalons; and an array of interferometric modulators on said buffer layer, wherein said array comprises optical cavities and a plurality of supports configured to align with the plurality of etalons;

wherein the height of the plurality of supports corresponds approximately to the height of the plurality of cavities; and wherein the plurality of etalons are electrically insulated from the array of interferometric modulators by the buffer layer.

25. The electromechanical systems display device of claim 24, comprising:

a processor that is configured to communicate with the array, the processor being configured to process image data; and a memory device configured to communicate with the processor.

26. The electromechanical systems display device of claim 25, further comprising a driver circuit configured to send at least one signal to the array.

27. The electromechanical systems display device of claim 26, further comprising a controller configured to send at least a portion of the image data to the driver circuit.

28. The electromechanical systems display device of claim 25, further comprising an image source module configured to send the image data to the processor.

29. The electromechanical systems display device of claim 28, wherein the image source module comprises at least one of a receiver, transceiver, and transmitter.

30. The electromechanical systems display device of claim 25, further comprising an input device configured to receive input data and to communicate the input data to the processor.

31. The electromechanical systems device of claim 2, wherein the etalon is configured to absorb substantially all visible light.

* * * * *